US007832598B2

(12) United States Patent
Rode et al.

(10) Patent No.: US 7,832,598 B2
(45) Date of Patent: Nov. 16, 2010

(54) BULK FOODSTUFF DISPENSER

(75) Inventors: Gregory A. Rode, Pueblo, CO (US); Steven Dodson, Kneeland, CA (US)

(73) Assignee: TR Toppers Inc., Pueblo, CO (US)

( * ) Notice: Subject to any disclaimer, the term of this patent is extended or adjusted under 35 U.S.C. 154(b) by 552 days.

(21) Appl. No.: 11/796,793

(22) Filed: Apr. 30, 2007

(65) Prior Publication Data

US 2008/0264978 A1    Oct. 30, 2008

(51) Int. Cl.
*G01F 11/20* (2006.01)

(52) U.S. Cl. ............................ 222/413; 222/1; 222/287; 222/311; 222/359; 222/448; 74/142

(58) Field of Classification Search .................. 222/287, 222/311, 359, 360, 410, 411, 412, 413, 1, 222/282, 293, 296, 367, 448; 74/141.5, 142
See application file for complete search history.

(56) References Cited

U.S. PATENT DOCUMENTS

| | | | | |
|---|---|---|---|---|
| 1,047,589 A * | 12/1912 | Sutton | ......................... | 222/413 |
| 1,497,772 A * | 6/1924 | Conklin | ....................... | 222/360 |
| 2,189,018 A * | 2/1940 | Robinson | .................... | 222/410 |
| 2,251,374 A * | 8/1941 | Pettigrew | .................... | 222/360 |
| 2,532,698 A * | 12/1950 | Corkins | ....................... | 222/360 |
| 2,593,803 A * | 4/1952 | Schofield | .................... | 222/413 |
| 3,304,691 A * | 2/1967 | Parker | ......................... | 222/360 |
| 4,136,803 A * | 1/1979 | Tobias et al. | ................. | 222/413 |
| 4,802,609 A * | 2/1989 | Morse et al. | ................. | 222/413 |
| 5,222,634 A * | 6/1993 | Hayes | ......................... | 222/413 |
| 5,287,993 A * | 2/1994 | Ford et al. | ................... | 222/413 |
| 5,899,248 A * | 5/1999 | Anderson | .................... | 222/226 |
| 6,062,438 A * | 5/2000 | Ellis et al. | .................... | 222/413 |
| 7,178,697 B2 * | 2/2007 | Brundick et al. | ............ | 222/243 |

* cited by examiner

*Primary Examiner*—Kevin P Shaver
*Assistant Examiner*—Jonathan Wood

(57) ABSTRACT

A bulk foodstuff dispenser for dispensing predetermined amounts of foodstuff from a hopper. An auger is driven by a handle capable of movement in two directions, while a clutch allows movement of the auger in only one direction. The forward movement of the handle causes the auger to rotate and move foodstuff forward to be dispensed. The forward movement of the handle is predetermined by setting a stopper, thereby regulating the amount of rotation of the auger and thus determining the portion of foodstuff to be dispensed. A spring returns the handle to its at rest position, so that the dispensing process may be repeated from the same handle position. Gears between the handle and the auger allow the handle to be pulled in a more ergonomically sound way.

9 Claims, 7 Drawing Sheets

BULK FOODSTUFF DISPENSER

FIELD OF THE INVENTION

This invention relates to bulk foodstuff dispensers, and more particularly to a dispenser having an auger capable of rotation in a single direction and driven by a handle capable of movement in two directions, for dispensing controlled portions of bulk foodstuff.

BACKGROUND OF THE INVENTION

Bulk foodstuff dispensers have long been known and used to dispense portions of foodstuffs. Foodstuffs to be dispensed have varied from those which are hard and not easily broken, such as nuts and frozen toppings, to more fragile pieces such as cereal flakes or puffed cereal. Dispensers typically include a holding bin or hopper for containing a bulk supply of foodstuffs to be dispensed, and a dispensing mechanism for moving foodstuff to a dispensing opening, where a portion of the foodstuff is dispensed. It is also common for such dispensers to be used in a commercial setting where it is necessary to dispense a series of measured portions. The effectiveness of any foodstuff dispenser may thus be measured by how well and how consistently the dispensing mechanism moves foodstuff from the hopper to the dispensing opening, and by how well and consistently it dispenses measured portions of a foodstuff. Ergonomics are also an important consideration, particularly when an operator may be dispensing a great many portions of foodstuff over an extended period.

Many known foodstuff dispensers utilize gravity to move the foodstuff from the hopper to the dispensing opening. U.S. Pat. No. 5,899,248 to Anderson, and U.S. Pat. No. 7,178,697 to Brundick both disclose dispensers which utilize agitators to keep the bulk foodstuff from sticking together, and to keep the foodstuff moving under the force of gravity until they are dispensed. The dispensers of Anderson and Brundick are effective for their intended mode of operation, but do not have any capability to accurately dispense predetermined portions of foodstuffs.

U.S. Pat. No. 2,593,803 to Schofield; U.S. Pat. No. 4,802,609 to Morse et. al.; U.S. Pat. No. 5,222,634 to Hayes; and U.S. Pat. No. 6,062,438 to Ellis et. al disclose dispensers utilizing augers to move foodstuffs toward an opening where they are dispensed. Each of those patents uses either a crank or a knob to rotate the respective device's auger, with the crank or knob being fixedly attached to the auger such that the respective knob or crank rotates in the same direction as and in unison with the rotation of the auger. Portion control is effected by the user rotating the crank or knob until the desired portion has been dispensed. This method of dispensing the desired portion of foodstuff is more effective than gravity-fed dispensers. However, because the starting position and ending position of the knob/crank typically vary from one dispensing to the next, it is not possible to accurately pre-determine the desired portion to be dispensed. Instead, any such accuracy which may be achieved comes as a result of the operator of the device becoming more adept through trial and error at turning the knob/crank just the right amount to provide the desired portion to be dispensed. This is an inefficient and wasteful approach to portion control, particularly in food operations involving numerous workers, often of an unskilled or untrained nature. In addition, because the knob or crank rotates on a plane at right angles to the longitudinal axis of the auger, the aforementioned dispensers may not be as ergonomically sound as would be desirable. For example, having a worker repeatedly turn a knob with some force required could often lead to repetitive use injuries, such as carpal-tunnel syndrome.

Therefore, what is needed is an ergonomically sound dispenser which is capable of accurately dispensing pre-determined portions of foodstuffs with a minimum amount of operator training and experience.

SUMMARY OF THE INVENTION

In accordance with this invention, a bulk foodstuff dispenser is provided which includes a hopper for holding foodstuff. The hopper has an opening at the bottom which allows foodstuff to fall into an auger. Ideally the auger is housed in a semi-circular bottom portion of the hopper which has a dispensing end away from the auger. The auger is activated by a handle which has an at rest position and is capable of movement in a direction away from its at rest position so as to rotate the auger. A first gear located between the auger and the handle is in communication with the handle and is capable of being activated by movement of the handle. A second gear located between the first gear and the auger is capable of being driven by the first gear to rotate the auger. A clutch or the like allows rotation of the auger as the handle travels away from its at rest position, but prevents rotation of the auger when the handle returns to its at rest position. A portion control stopper acts to limit the maximum forward travel of the handle. Ideally a spring is provided to automatically return the handle to its at rest position after each portion of foodstuff is dispensed. In this way a bulk foodstuff dispenser is provided which has an auger which is capable of movement in one direction, and which is driven by a handle capable of movement in both a forward and a backward direction. The maximum forward motion of the handle is precisely controlled, and the handle is automatically returned to its at rest position after each dispensing. Thus the dispenser is capable of precisely delivering a predetermined amount of foodstuff with each pull of the handle, with a minimum of operator skill and training required. The handle and gears are also oriented in an ergonomically sound way, so as to minimize physical strain on the operator.

Additional advantages of this invention will become apparent from the description which follows, taken in conjunction with the accompanying drawings.

DETAILED DESCRIPTION OF THE INVENTION

Figure 1:
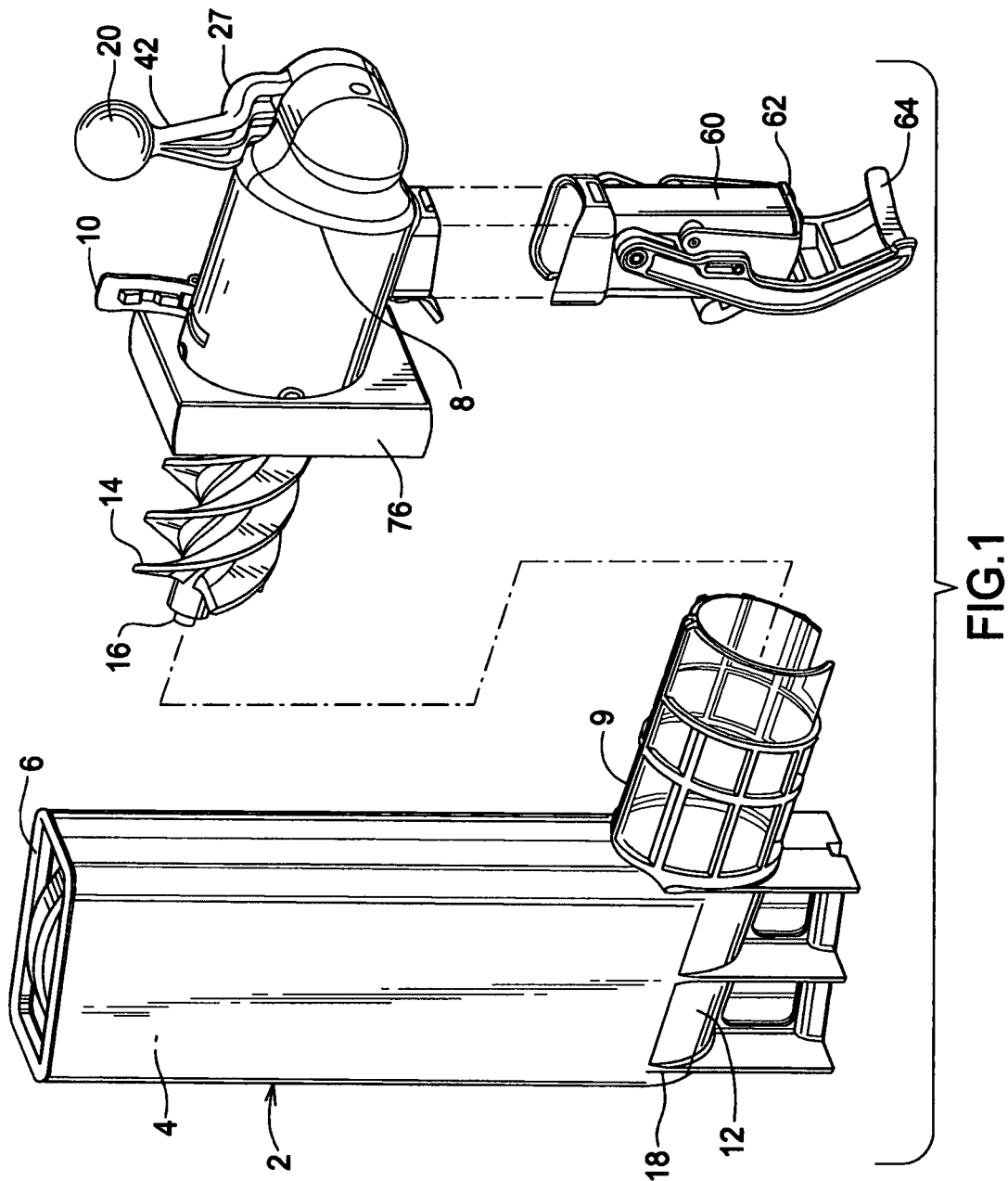
FIG. 1 is a perspective view of the dispenser showing the overall arrangement of the hopper, auger, dispenser head, and metering assembly.

Referring now to the drawings, as shown in FIGS. 1-4, a bulk foodstuff dispenser 2 is depicted. The dispenser 2 includes a hopper 4 for holding foodstuff to be dispensed, and a hopper lid 6 for sealing the contents of the hopper from the surrounding air. A dispenser head 8 is securely and removably attached to the hopper 4 by head latch 10. The hopper 4 preferably has a semi-cylindrical bottom portion 12, adapted to accommodate an auger 14. The auger 14 extends from the bottom 12 of the hopper 4 through the dispenser head 8, which is preferably oval or circular in cross-section to better fit the auger. For best results, dispenser head 8 fits concentrically over and is supported by head support structure 9. Moving the latch 10 to its unlocked position, as shown in FIG. 1, allows the head 8 to be removed for easy cleaning of the head 8 and auger 14. Preferably, the auger 14 is also removably mounted to allow for easy removal and cleaning. The foodstuff contents of the hopper 4 are free to fall into the auger 14, so that turning the auger will cause the foodstuff to move forward through the dispenser head 8 as the auger 14 is turned.

In the operation of the preferred embodiment, the auger 14 is fixedly mounted to auger shaft 16, which is rotatably mounted to the rear 18 of the hopper 4 and extends into the dispenser head 8. When foodstuff is to be dispensed, the handle 20 is pulled forward toward the user. This forward motion of the handle 20 causes the handle shaft 22 to rotate, thereby rotating the first bevel gear 24, which is fixedly attached to the handle shaft 22. The rotation of the first bevel gear 24 causes the second bevel gear 26 to rotate at right angles to the rotation of first bevel gear 24, thereby rotating drive shaft 17 in a clockwise direction. When the shaft 17 rotates in a clockwise direction, one-way clutch 30 engages spline unit 32, causing the spline unit to also rotate in a clockwise direction. When spline unit 32 rotates, it engages spline-receiving unit 34 on the forward end of auger 14, thereby rotating the auger and moving foodstuff forward to the head 8 to be dispensed. The dispenser door 36 is rigidly attached to the shaft 17 by door pin 37, so that the rotation of the drive shaft 17 caused by pulling the handle 20 also opens the dispenser door 36, thus allowing foodstuff to be dispensed by falling out of the head 8. It is understood that the direction of rotation of auger 14 is a purely arbitrary design choice, and the auger could be arranged to rotate in the opposite direction depending on the location of the handle 20 and gears 24, 26.

The one-way clutch utilized in the preferred embodiment is a roller clutch, although any one of many well-known clutches available for such a purpose off-the-shelf may be used to accomplish the one-way action of the auger, while still allowing the handle freedom to move in both a forward and a backward direction. Such a one-way action of the auger coupled with a two-way action of the handle may also be accomplished by means other than a clutch. For example, a pawl-ratchet arrangement might also be used to allow the auger to turn in only one direction, while still allowing the handle to move in either direction. Likewise, there are several options possible for the auger shaft 16, other than the preferred embodiment option in which the auger is fixed to the shaft. One possibility is that the auger be capable of rotating freely around the shaft, such that the auger itself is rotated around the shaft by interaction with the spline unit. Another possibility is that the auger shaft may be omitted entirely, and the auger operated without a shaft. Additionally, the use of handle shaft 22 is an optional design feature. The handle shaft may also be omitted entirely and the handle 20 and gear 24 may be connected without the intervening shaft 22.

Figure 2:
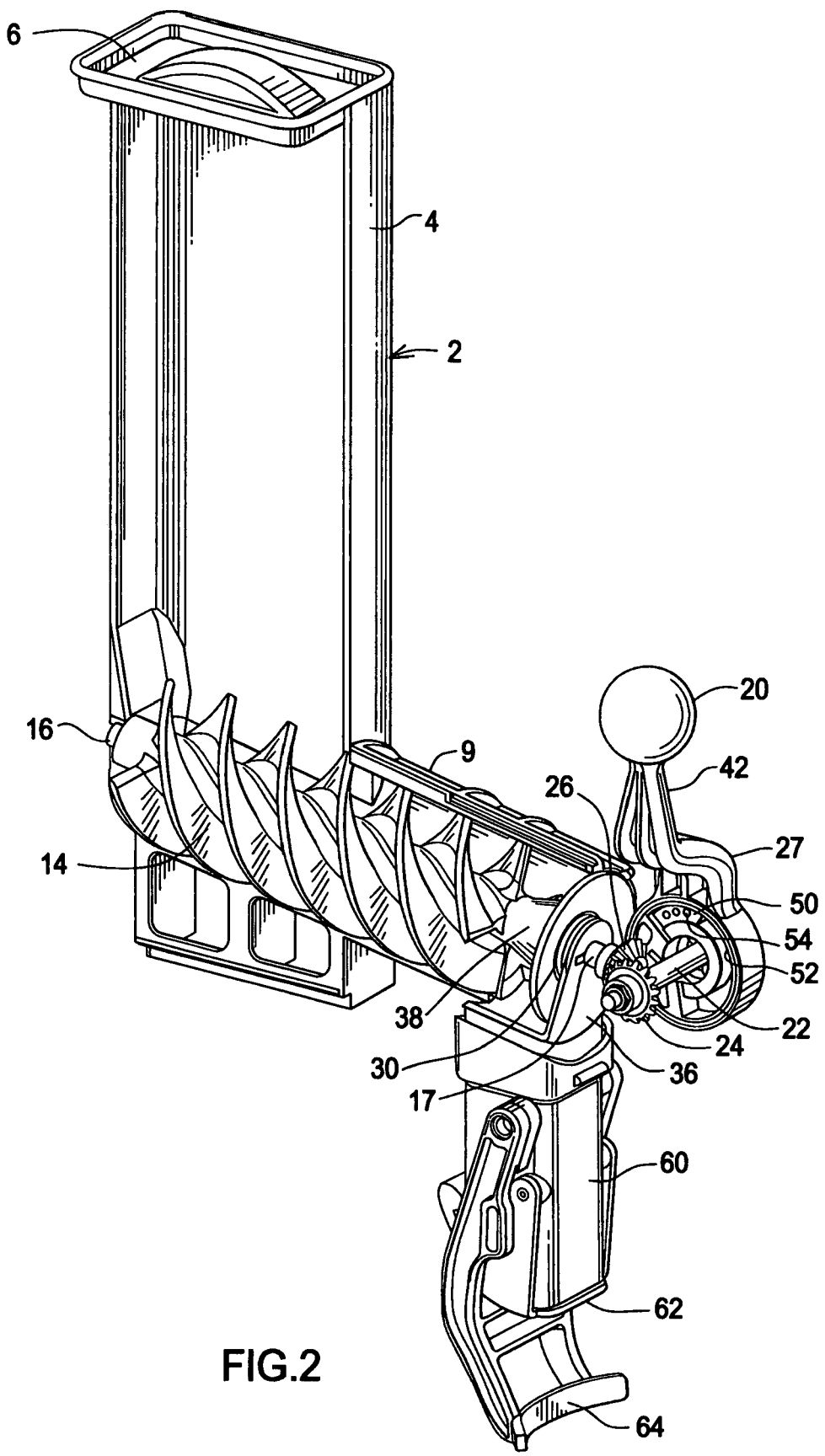
FIG. 2 is a partial cut-away view of the dispenser.
Figure 3:
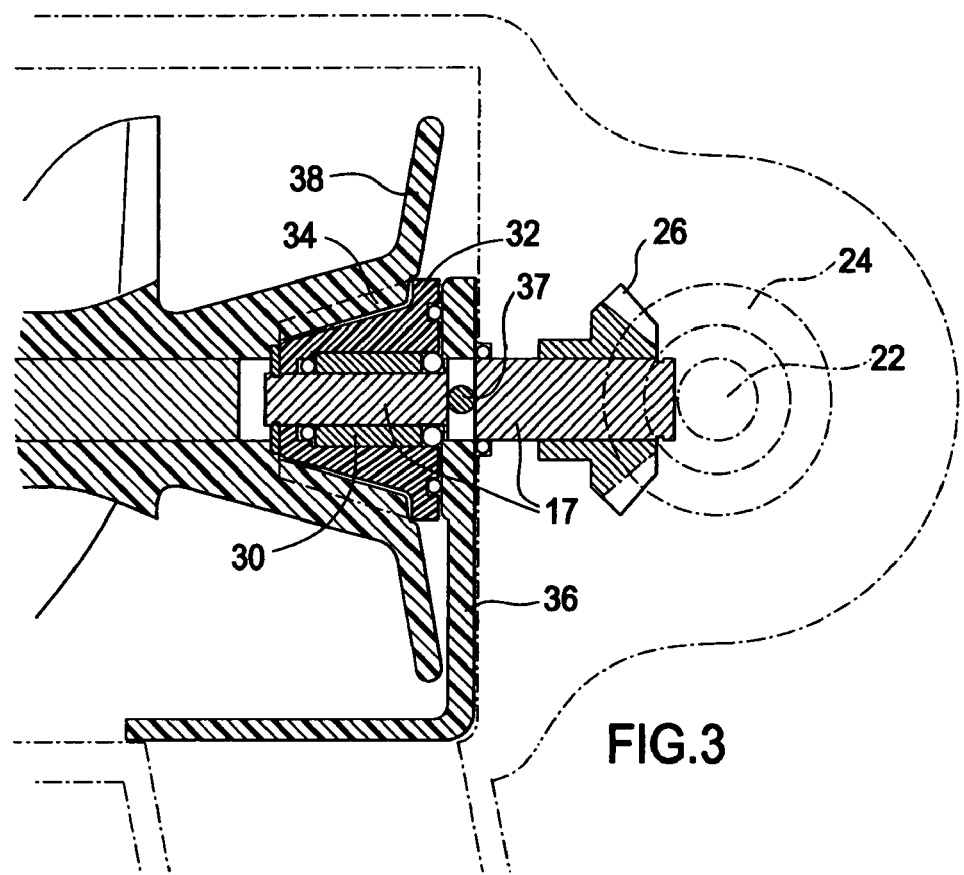
FIG. 3 is a cross-sectional view of the drive elements of the dispenser.
Figure 4:
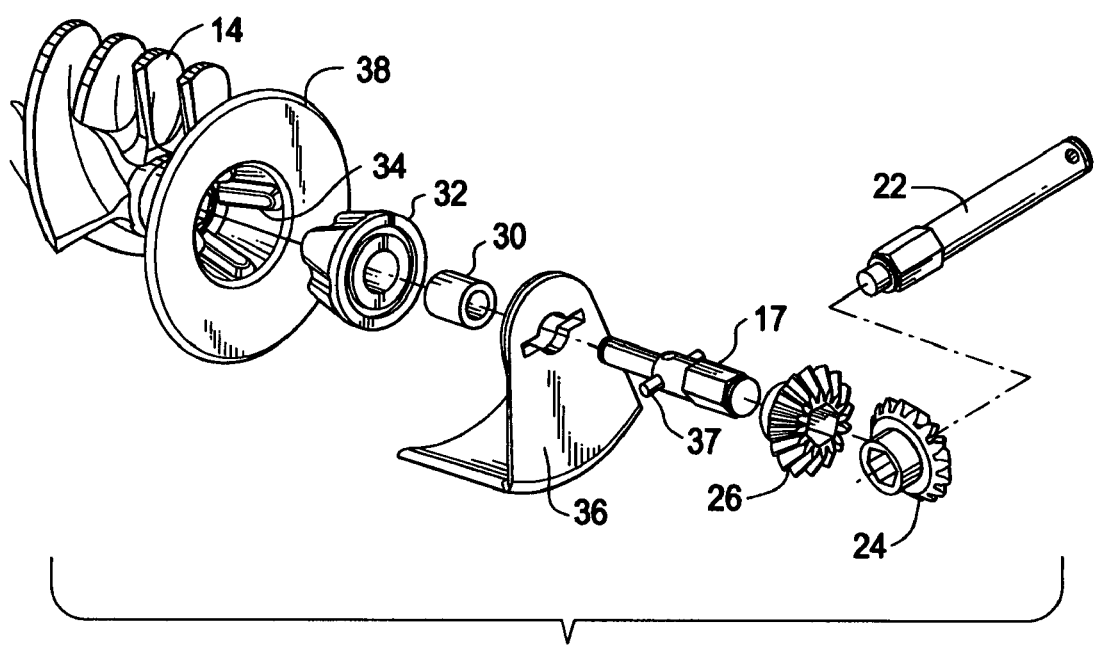
FIG. 4 is an exploded perspective view of the drive elements of FIG. 3.
Figure 5:
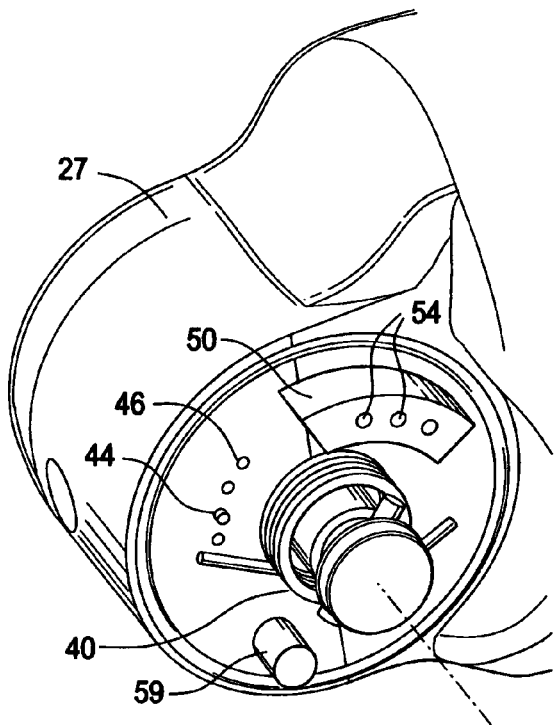
FIG. 5 is a cut-away perspective view of the elements which regulate the forward and reverse movement of the handle, including the stopper, the handle spring, and the handle spring stop pins.
Figure 6:
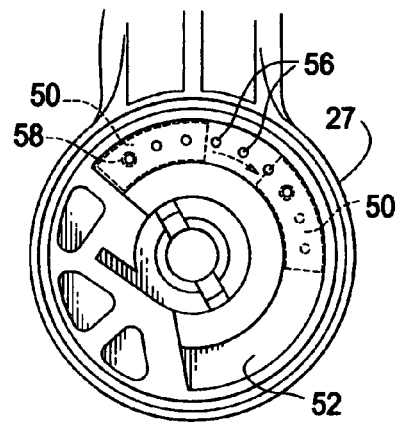
FIG. 6 is a cross-sectional view showing the annular portion of the handle assembly, with the position of the set screws and the holes for receiving them.
Figure 7:
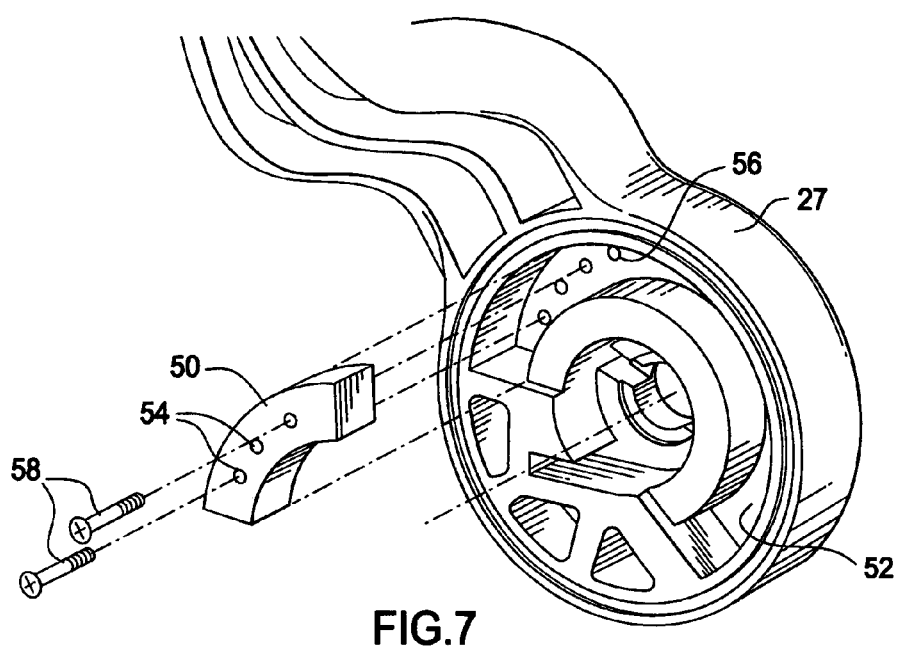
FIG. 7 is an exploded perspective view depicting the positioning of the stopper and set screws.

Referring now to FIGS. 5-7, when the user releases pulling pressure on the handle 20, the handle spring 40 causes the handle to automatically return to its at-rest position 42. The tension in handle spring 40 may be adjusted by selectively inserting spring stop-pin 44 into any one of the stop-pin holes 46. The one-way clutch 30 allows the handle 20, bevel gears 24, 26, drive shaft 17, and door 36 to rotate back to their original resting positions as depicted in FIG. 2, without rotating the auger 14. This one-way action of the auger 14 helps to prevent clogging, while the two-way action of the handle 20 allows the spring 40 to return the handle to precisely the same at-rest position 42 after each dispensing. The one-way action also allows the auger 14 to advance the dispensed foodstuff, as they would otherwise merely be moved back and forth by the rotation and counter-rotation of the auger 14, as the handle 20 moves forward and backward.

Clogging may be further prevented by optional cone-shaped flange 38 located on the forward end of the auger 14 where it abuts with the one-way clutch 30. As foodstuffs move past the front end of the auger 14 in the final stage before being dispensed, they are deflected by the cone-shaped flange 38, thereby preventing clogging of the foodstuff in the space between the auger 14 and the one-way clutch 30. In this way, the cone-shaped flange 38 keeps most if not all foodstuffs away from the door 36 and other parts of the dispense head 8. This is a significant improvement, for example, over a configuration in which the auger 14 would directly abut a flat surface on the rear of the one-way clutch 30. With its inherent right angle corners, such a configuration would almost invariably promote clogging of the foodstuffs between the auger 14 and the one-way clutch 30, especially with softer or more sticky types of foodstuffs.

The maximum forward travel of the handle 20 in response to a pull by the user is pre-determined by portion control stopper 50. The stopper 50 fits into an annular section 52 of the handle assembly 27, and is held securely in place by set screws 58. Optionally, radial ribbing or the like could also be provided to hold the stopper 50 in place. As the handle 20 is pulled forward, the stopper 50 also moves forward until it contacts stationary stopper pin 59, which is built into the dispenser head 8, thereby stopping the forward movement of the handle 20 at a predetermined end position. By securing the stopper holes 54 to appropriately selected holes from the set of handle assembly holes 56, the stopper may be moved and the maximum forward travel of the handle 20 may thereby be precisely regulated. This precise control of the maximum travel of the handle 20, coupled with returning the handle 20 to the same at-rest position 42 after each use, also precisely controls the amount of turn of the auger 14 for each pull of the handle, thereby assuring that an exact and pre-determined amount of foodstuff is moved forward for dispensing each time the handle is pulled.

A number of alternative combinations may optionally be utilized to precisely control the travel of the handle and the resulting turn of the auger, which together combine to control the portion of foodstuff to be dispensed. For example, the head 8 may incorporate a fixed position for the stopper 50, and the head itself may then be removed and replaced with a head having a different selected fixed stopper position. This changes the maximum forward travel of the handle 20 as effectively as the adjustable stopper configuration described above. In addition the ratios of the first and second gears 24,26 may also be changed, either by changing the gears themselves, or by providing additional gears and a transmission to change the ratios. In this way the turn of the auger 14 resulting from a given maximum travel of the handle 20 may be regulated as desired. It is also possible to eliminate the gears entirely, while maintaining the use of one-way clutch 30. This simplifies the operation of the dispenser, but has the disadvantage of not allowing the handle 20 to be pulled at right angles to the auger 14.

Once the handle 20 has been pulled forward through its maximum travel, the predetermined amount of foodstuff is dispensed through the dispenser door 36. Dispenser door 36 is attached to the drive shaft 17 by door pin 37, so that pulling the handle 20 forward swings the dispenser door open. The dispenser door 36 is preferably attached to the shaft 17 in such an orientation that the door is always fully opened by pulling the handle 20 to the end of its travel, even when the portion control stopper 50 is set to deliver the smallest possible pre-determined amount of foodstuff.

Optionally, a meter tube 60 may be attached to the dispenser head 8 just below the dispenser door 36, to receive the pre-determined foodstuff portion. As the foodstuff portion to be dispensed is precisely controlled by setting the position of the portion control stopper 50, the meter tube acts merely as a convenient way to dispense the foodstuff. The meter tube may also be constructed of transparent material, and thus conveniently act as a visual double-check on the foodstuff portion to be dispensed. A door 62 in the bottom of the meter tube 60 may be activated by the use of a conveniently located meter actuator 64, thereby dispensing the foodstuff as desired.

Figure 8:
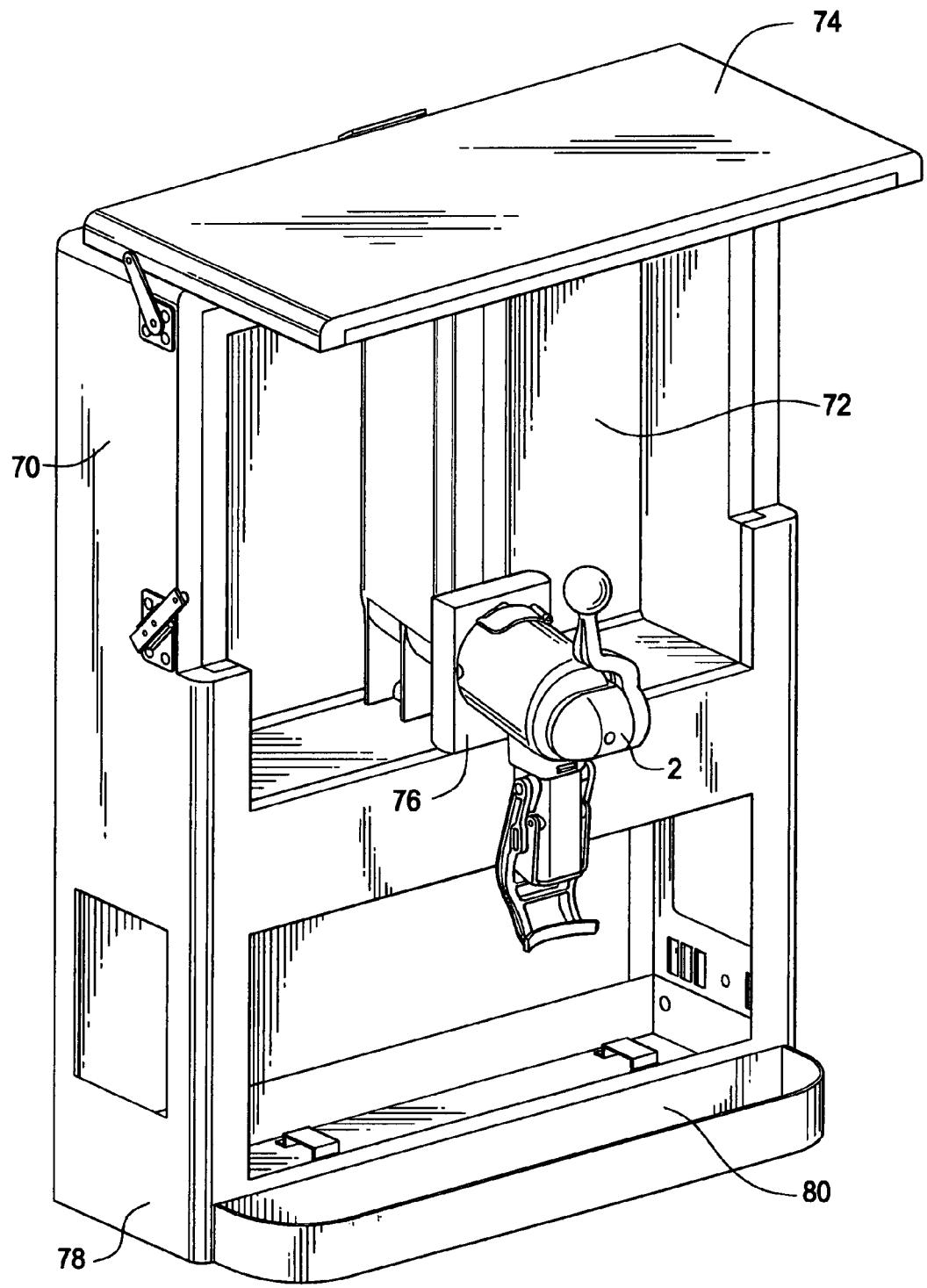
FIG. 8 is a perspective view of a single dispenser positioned in a freezer cabinet.
Figure 9:
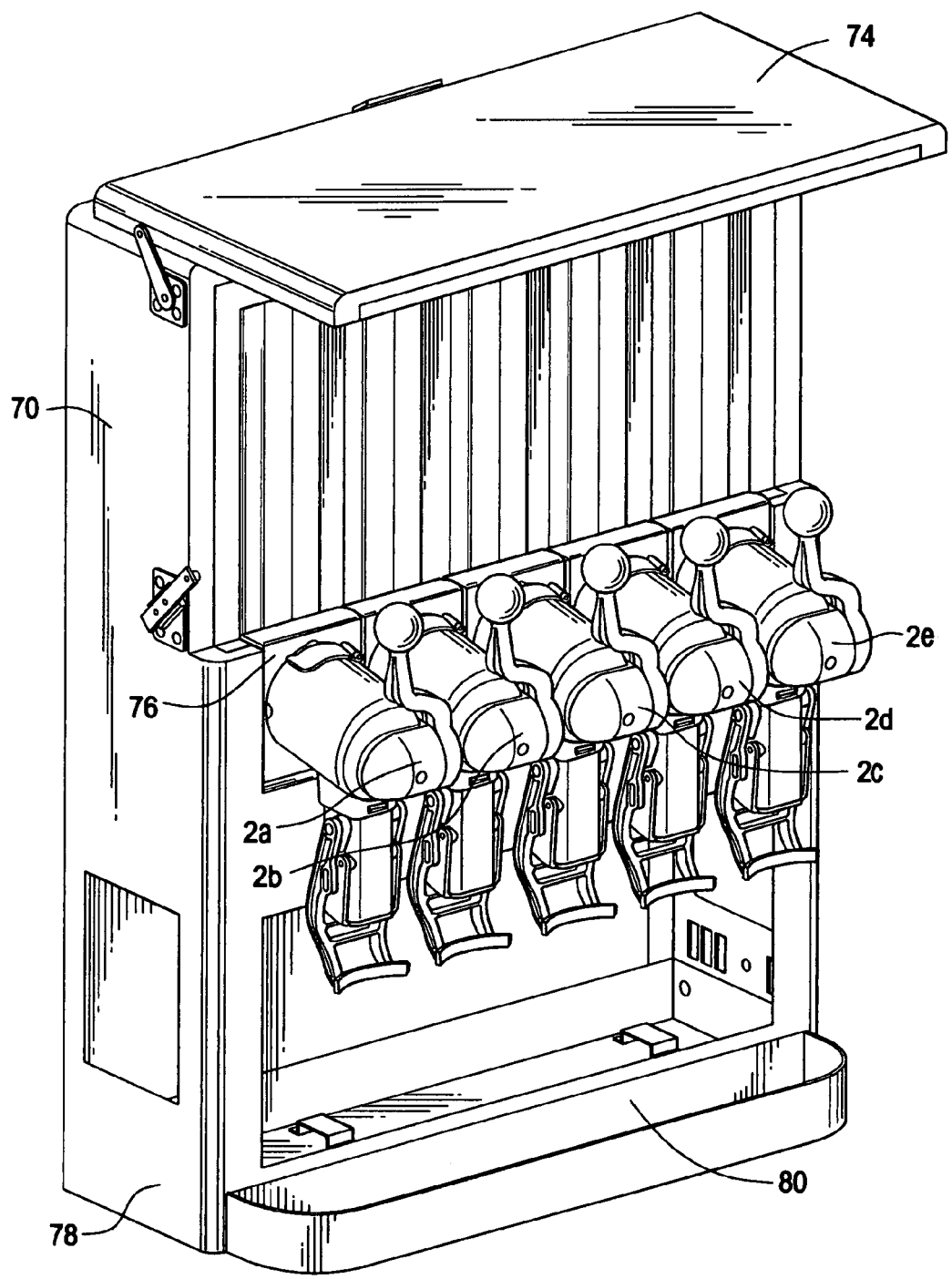
FIG. 9 is a perspective view of multiple dispensers positioned in a freezer cabinet.
Figure 10:
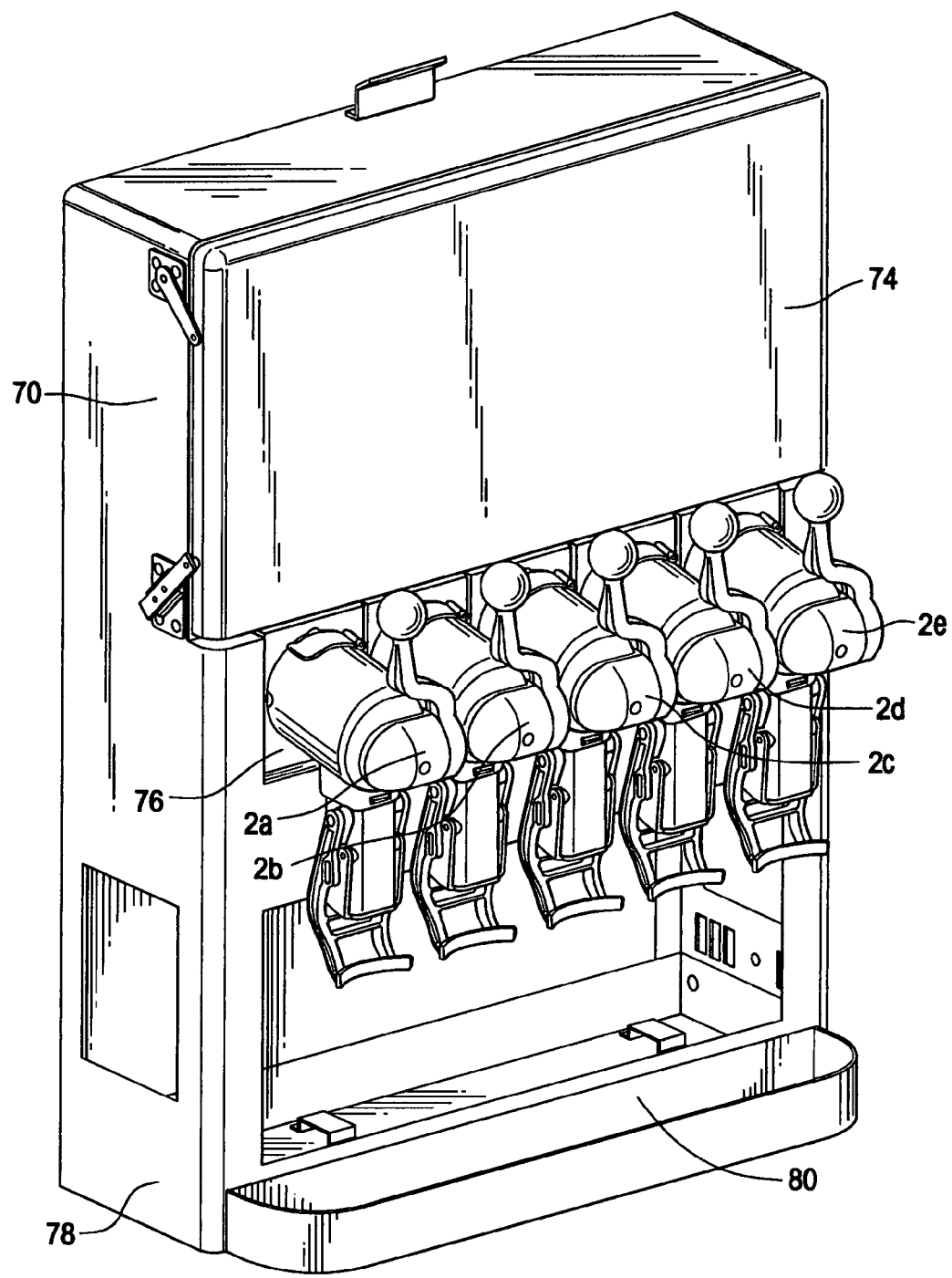
FIG. 10 is a perspective view of multiple dispensers arranged in a freezer cabinet, showing airtight sealing of the arrangement.

Referring now to FIGS. 8-10, a freezer cabinet 70 is provided for cooling the foodstuff dispenser 2. Placing each individual dispenser unit 2 in the freezing cabinet 70 allows frozen confections to be dispensed without softening or melting occurring. As best seen in FIG. 8, the cabinet includes a cooling compartment 72 for receiving one or more foodstuff dispensers 2. The cooling compartment 72 is accessed by opening cooling compartment door 74 and inserting the dispenser 2. Ideally a bank of multiple dispensers, for example 2a, 2b, 2c, 2d, and 2e as shown in FIG. 9, is inserted into the compartment 72. This allows any of several foodstuffs to be selectively dispensed. Once the dispensing units have been placed in the cooling compartment 72, the door 74 is closed as shown in FIG. 10, and the dispenser gasket collars 76 mate with the door 74 to form an airtight seal to keep the compartment 72 cool. The freezer cabinet 70 rests on its base 78, and has an optional container stand 80 upon which the main dessert dish to be topped may be conveniently placed.

The invention claimed is:

1. A dispenser for dispensing foodstuff, comprising:
a hopper for said foodstuff, said hopper having an opening;
an auger disposed in communication with said opening;
means for driving said auger, said drive means including a manually-activated handle having an at rest position and being capable of movement away from said at rest position to rotate said auger;
means for allowing rotation of said auger as said handle travels away from its at rest position, and preventing rotation of said auger as said handle is returned to its at rest position; and
means for enclosing said auger, said enclosing means having a dispensing opening such that as said auger is rotated foodstuff flows to said dispensing opening and is dispensed.

2. A dispenser as claimed in claim 1, wherein said drive means includes:
the manually-activated handle;
a first gear disposed between said handle and said auger and capable of activation by movement of said handle; and
a second gear in communication with said auger and with said first gear, said second gear being disposed at approximately a right angle to said first gear and being capable of being driven by said first gear to rotate said auger.

3. A dispenser as claimed in claim 2, further including:
a handle shaft connected to said handle, said handle shaft being connected to said first gear for activation of said first gear.

4. A dispenser as claimed in claim 1, further including:
means for stopping the motion of said handle at an end position away from its at rest position after said handle has traveled a selected distance, thereby regulating the rotation of said auger and dispensing a controlled portion of foodstuff.

5. A dispenser as claimed in claim 4, further including:
means for adjusting the position of said stopping means, to change the selected distance traveled by said handle to said end position.

6. A dispenser for dispensing foodstuff, comprising:
a hopper for said foodstuff, said hopper having an opening;
an auger disposed in communication with said opening;
a handle connected to said auger, said handle having an at rest position and capable of movement to rotate said auger;
a first gear disposed between said handle and said auger, said first gear being in communication with said handle and being capable of activation by movement of said handle;
a second gear in communication with said auger and with said first gear, said second gear being disposed at approximately a right angle to said first gear and being capable of being driven by said first gear to rotate said auger;
means for allowing rotation of said auger as said handle travels away from its at rest position, and preventing rotation of said auger as said handle is returned to its at rest position;
means for stopping the motion of said handle at an end position away from its at rest position after said handle has traveled a selected distance; and
means for enclosing said auger, said enclosing means having a dispensing opening such that as said auger is rotated foodstuff flows to said dispensing opening and is dispensed.

7. A dispenser as claimed in claim 6, further including:
means for returning said handle from said end position to said at rest position.

8. A dispenser as claimed in claim 6, further including:
means for adjusting the position of said stopping means, to change the selected distance traveled by said handle to its end position.

9. A method for dispensing a controlled portion of foodstuff, comprising the steps of:
providing a hopper for said foodstuff, said hopper having an opening;
providing an auger disposed in communication with said opening;

providing means for driving said auger, said drive means including a manually activated handle having an at rest position and being capable of movement away from said at rest position to rotate said auger;

providing means for allowing rotation of said auger as said handle travels away from its at rest position, and preventing rotation of said auger as said handle is returned to its at rest position;

providing means for enclosing said auger, said enclosing means having a dispensing opening such that as said auger is rotated foodstuff flows to said dispensing opening and is dispensed;

providing means for stopping the motion of said handle at an end position away from its at rest position after said handle has traveled a selected distance, thereby regulating the rotation of said auger, and pulling said handle from its rest position to its end position to dispense a controlled portion of foodstuff.

* * * * *